United States Patent [19]

Dijken

[11] Patent Number: 4,843,270
[45] Date of Patent: Jun. 27, 1989

[54] ELECTRICAL MACHINE WITH UNEQUAL POLE FACES

[75] Inventor: Reinder H. Dijken, Groningen, Netherlands

[73] Assignee: U.S. Philips Corporation, New York, N.Y.

[21] Appl. No.: 70,856

[22] Filed: Jul. 8, 1987

[30] Foreign Application Priority Data

Jul. 17, 1986 [NL] Netherlands ............... 8601869

[51] Int. Cl.$^4$ ............ H02K 1/08; H02K 3/18; H02K 21/00
[52] U.S. Cl. ............... 310/208; 310/164; 310/206; 310/254; 310/261; 318/138
[58] Field of Search ............... 310/49 R, 156, 168, 310/263, 268, 154, 206, 208, 254, 261, 269; 318/138, 254

[56] References Cited

U.S. PATENT DOCUMENTS

| | | | |
|---|---|---|---|
| 2,063,340 | 12/1935 | Ruben | 172/36 |
| 2,790,098 | 4/1957 | Nyyssonen | 310/202 |
| 3,466,518 | 9/1969 | Aylikci | 318/138 |
| 3,679,953 | 7/1972 | Bedford | 318/701 |
| 4,260,926 | 4/1981 | Jarret | 310/254 |
| 4,315,171 | 2/1982 | Schaeffer | 310/49 R |
| 4,347,457 | 8/1982 | Sakamoto | 310/156 |
| 4,348,605 | 9/1982 | Török | 310/168 |
| 4,371,817 | 2/1983 | Müller | 318/138 |
| 4,450,396 | 5/1984 | Thornton | 318/696 |
| 4,516,048 | 5/1985 | Brigham | 310/156 |

FOREIGN PATENT DOCUMENTS

| | | |
|---|---|---|
| 25454 | 1/1884 | Fed. Rep. of Germany . |
| 1388867 | 10/1966 | France . |
| 59-83565 | 5/1984 | Japan . |
| 373603 | 5/1932 | United Kingdom . |

OTHER PUBLICATIONS

K. C. Mukherji et al., "Vernier Reluctance Motor", PIEE vol. 121, No. 9 (Sep. 1974), pp. 965–971.

Primary Examiner—Patrick R. Salce
Assistant Examiner—D. L. Rebsch
Attorney, Agent, or Firm—F. Brice Faller

[57] ABSTRACT

An electrical machine comprises a rotor (2) and a stator (5) as machine parts, means for generating an excitation flux, and active coils (W1-W5). In operation the coils link at least a portion of the excitation flux and generate a rotational e.m.f. The rotor and the stator comprise poles, the number of stator poles (N1-N6, S1-S6) differing from the number of rotor poles (T1$^x$-T5$^x$). During operation, the flux pattern of the portion of the excitation flux linking with the active coils rotates relative to the machine part carrying the active coils with such an angular velocity that the absolute value of the difference between said angular velocity and the angular velocity of the machine part comprising the active coils is larger than the absolute value of the difference in angular velocity between the rotor and the stator. For this purpose the pole faces (RS) of the rotor poles, viewed in the circumferential direction of the rotor, have a different width than the pole faces (PS) of the stator poles. Moreover, the active coils are arranged diametrally in the form of a cylindrical winding or in the form of an annular winding.

9 Claims, 7 Drawing Sheets

ELECTRICAL MACHINE WITH UNEQUAL POLE FACES

The invention relates to an electrical machine of the electromagnetic type comprising a rotor and a stator as machine parts, means for generating an excitation flux, and active coils which in operation periodically link at least a portion of the excitation flux and in which a rotational emf is generated. The rotor comprises spaced rotor poles and the stator comprises spaced stator poles, the number of poles of the machine part carrying the active coils being at least four. As a result of the rotation of the rotor relative to the stator during operation, the flux pattern of the portions of the excitation flux which link with the active coils rotate with an angular velocity which differs from the angular velocity of the machine part comprising the active coils. The absolute value of that difference is greater than the absolute value of the difference in angular velocity between the rotor and the stator.

Such a machine is known from French patent specification No. 88001. The known machine comprises a stator with north poles and south poles and a rotor which cooperates with the stator and which has a number of rotor teeth with rotor poles, a separate coil being arranged around each of the rotor teeth. As the width of the pole faces of the rotor poles, viewed in the circumferential direction of the rotor, is equal to that of the pole faces of the stator poles and the pole faces of the stator poles are equally wide, a relatively large magnetic short-circuit will occur in the motor, resulting in a poor utilization of the excitation flux generated in the stator.

U.S. Pat. No. 4,450,396 (herewith incorporated by reference) discloses a synchronous motor comprising a rotor with outwardly directed teeth, comprising a lamination core surrounded by a stator with inwardly directed teeth arranged in groups. The stator comprises four excitation coils which are each arranged around four stator teeth. During operation the excitation coils form pairs of north poles and south poles at the stator teeth. Moreover, four active coils each having two coil sides are situated in the stator. During operation one of the two coil sides of each active coil is disposed underneath a north pole and the other coil side is situated underneath a south pole. By alternately energizing the active coils the rotor is rotated stepwise. This motor exhibits a flux pattern which does not rotate but which slightly oscillates. This known motor only produces a limited torque and a limited power because only a limited excitation flux is generated on account of the method of winding.

U.S. Pat. No. 3,679,953 (herewith incorporated by reference) describes a reluctance mot or comprising a rotor of a suitable ferromagnetic material such as soft iron and an annular stator having inwardly directed teeth. The rotor has outwardly directed teeth. The number of stator teeth differs from the number of rotor teeth. The rotor is rotated by means of excitation coils which are each arranged around one stator tooth. This motor can also deliver only a limited power and a limited torque because again the active coils are not wound in such a way that a maximal flux linkage is obtained as in the machine in accordance with the invention.

SUMMARY OF THE INVENTION

Electrical machines are obtained which, when constructed as motors, are capable of delivering a higher mechanical power for a given speed and given dimensions. When constructed as generators, a higher electric power is produced for a given speed and given dimensions.

According to the invention, in one embodiment the excitation flux is generated by separate means and the number of poles of the machine part which does not comprise the active coils is equal to $2(t+a)$, where $t$ is the number of poles of the machine part carrying the active coils and $a$ is an integer which differs from zero and $-t/2$. The active coils are wound at least substantially diametrically in the form of a cylindrical winding, and each active coil in the positions in which it links a maximal portion of the excitation flux links the entire excitation flux except for the stray component thereof. The pole faces of at least some of the stator poles have other dimensions than the pole faces of at least some of the rotor poles, in a variant of this embodiment, in that the active coils are arranged in the form of toroidal type winding. Each active coil in those positions in which it links a maximal portion of the excitation flux links substantially half the excitation flux except for the stray component thereof, and the pole faces of at least some of the stator poles have other dimensions than the pole faces of at least some of the rotor poles.

If the excitation flux is generated by the active coils themselves, as in a reluctance motor or an induction motor, and, in addition, the number of poles of the machine part which does not comprise the active coils is equal to $t+a$, where $t$ is the number of poles of the machine part carrying the active coils and $a$ is a non-zero integer. The active coils are wound at least substantially diametrically in the form of a cylindrical winding, and each active coil in the positions in which it links a maximal portion of the excitation flux links the entire excitation flux except for the stray component thereof. The pole faces of at least some of the stator poles have other dimensions than the pole faces of at least some of the rotor poles.

The difference in dimensions between the pole faces of the stator poles and the rotor poles, in particular the difference in width of the pole faces viewed in the circumferential direction of the rotor, is essential in order to minimize losses as a result of magnetic short-circuits.

In machines according to the invention the active coils need to have only a limited number of turns because the active coils can link a maximal portion of the total excitation flux which is generated. On account of the limited number of turns the resistance of the active coils can be low and the machine in accordance with the invention, when constructed as a motor, can handle a large load current and hence a high electric power, so that it is also capable of delivering a high mechanical power. When constructed as a generator the machine in accordance with the invention is obviously capable of delivering a high electric power.

In one easily fabricated embodiment of the invention, the excitation of field flux is provided by an outer ring including a magnet which is magnetized in a direction parallel to the axis of the ring. The ring also have bodies of a soft-magnetic material at its upper side and its lower side. Each of the bodies has inwardly directed teeth serving as poles, the teeth at the upper side and those at the lower side of the ring being offset from each other by half the tooth pitch. The machine also has an inner disc-shaped body of a soft-magnetic material having outwardly directed teeth.

Alternatively, the machine may include an inner annular or disc-shaped magnet which is magnetized in a direction parallel to its axis. The magnet is provided with soft-magnetic discs at its upper side and at its lower side. These discs have outwardly directed teeth serving as poles. The machine also has an outer annular soft-magnetic body having inwardly directed teeth at its upper side and its lower side, the teeth at the upper side and those at the lower side being offset from one another by half the tooth pitch.

In another alternative, the machine may have an outer annular soft-magnetic member having inwardly directed teeth, an inner disc-shaped or annular magnet which is magnetized in a direction parallel to its axis and at its upper side and its lower side is provided with annular soft-magnetic discs having outwardly directed teeth serving as poles. The teeth at the upper side and those at the lower side are offset from each other by a whole tooth pitch. Active coils in the form of toroidal-type windings are arranged around the outer annular member. This embodiment can operate as a low-speed three-phase motor.

DETAILED DESCRIPTION OF THE PREFERRED EMBODIMENTS

The embodiments of the machine in accordance with the invention described hereinafter are mainly embodiments constructed as motors. With due alterations the description also applies to an electrical generator of the electro-magnetic type.

Definitions

The following definitions relate to the foregoing and to the following description:

The rotor is the rotating part of the machine and the stator is the non-rotating part of the machine.

Poles are to be understood to mean hard-magnetic or soft-magnetic portions of the rotor and the stator disposed at the air gap between the rotor and the stator. Generally, non-magnetic gaps will be situated between the poles; the portions are then tooth-shaped. If the poles are made of a hard-magnetic material the gaps are sometimes absent; the portions then adjoin each other.

Active coils are coils in which a rotational emf (electromotive force) is generated, i.e. the coils for converting electric power into mechanical power (in the case of a motor) or for converting mechanical power into electric power (in the case of a generator). The active coils may be arranged either on the rotor or on the stator.

A motor or a generator has a cylindrical winding when each active coil can link with the entire excitation flux except for the stray component.

A machine has a toroidal-type winding when the excitation flux is split into two parts in the machine part comprising the active coils and the active coils link with half the excitation flux except for the stray component.

The excitation flux is the magnetic flux which in conjunction with the currents through the active coils produces the electro-mechanical torque and generates the rotational emf in the active coils.

The stray component of the excitation flux is that part of the excitation flux which cannot link with the active coils.

Prior Art Motor

The principle of the electric motor in accordance with the invention will now be explained by comparing known two-pole dc commutator motor with a permanent magnetic stator shown in FIGS. 1 and 2.

The known motor comprises a stator S having two stator poles N1 and S1 and a rotor having six rotor teeth 1 to 6 and six active coils W1 to W6. The rotor R is rotatable relative to the stator S about an axis A.

The known motor complies with the equation $$U - IR - E = 0 \qquad (1)$$

where U is the voltage of the power-supply source, E is the rotational emf generated in the active coils of the motor during operation, I is the current through the active coils, and R is the resistance of the active coils. The electric power equation of the motor follows from (1):

$$UI - I^2R - EI = 0 \qquad (2)$$

In this equation UI is the electric power consumption, $I^2R$ represents the copper losses in the active coils, and EI is the electromechanical power.

The magnitude of R determines the maximum mechanical power that can be delivered by the motor when a given voltage U is applied. This means that the rotor resistance R must be minimized.

The rotational emf of the known dc commutator motor complies with the equation $$E = 2n\phi w. \qquad (3)$$

In this equation $\phi$ the value of that portion of the excitation flux produced by the stator which is linked with each active coil at maximal linking, w is the number of rotor turns, and n is the speed of the rotor relative to the fixed direction of the flux $\phi$.

In accordance with the inventive principle the rotation of the rotor causes the flux pattern of the excitation flux to be rotated relative to the stator during operation. E is then no longer determined solely by the speed n of the rotor, but by the difference between the speed n of the rotor and the speed of the rotating flux pattern of the excitation flux. If the speed of the rotor relative to the rotating flux pattern is N, the motor in accordance with the invention complies with the equation $$E = 2N\phi w. \tag{4}$$

DC Motors

FIGS. 3a–d show a possible embodiment of a dc commutator motor in accordance with the invention comprising a permanent magnetic stator S. This motor has a rotor R comprising six teeth 1 to 6, between which six grooves are situated in which the coils W1–W3 are arranged. For practical reasons it may be necessary to wind the coils around two teeth each. Inside the steel ring of the stator S, 14 magnets are arranged, which alternately exhibit north poles and south poles (N1–N7 and S1–S7 respectively) at the rotor side.

Figure 1:
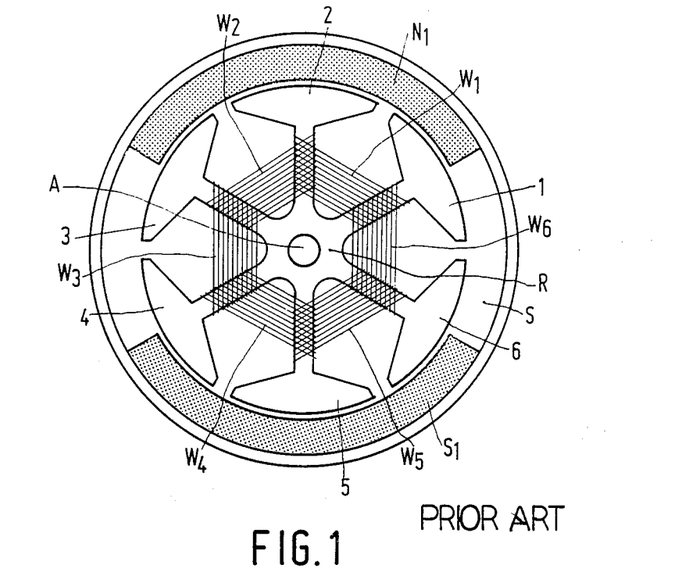
FIG. 1 is a diagrammatic view of a prior-art two-pole d.c. commutator motor.
Figure 2:
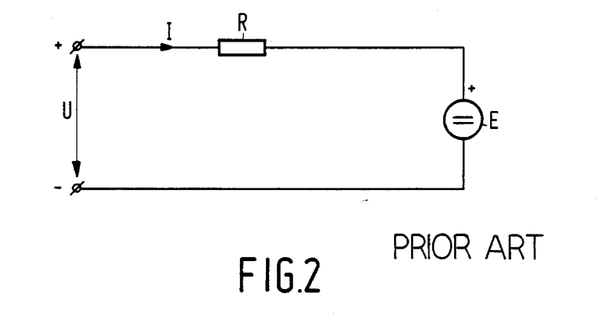
FIG. 2 shows the equivalent diagram for the motor of FIG. 1.

As can be seen in FIG. 1, the prior art two-pole dc commutator motor comprises only two segment-shaped permanent magnets N1 and S1 in the stator. The upper magnet has a north pole at its inner side and the lower magnet has a south pole at its inner side. The rotor R has six teeth 1 to 6 and, consequently, six grooves, in which the turns of the coils are arranged. In the known dc commutator motor the flux pattern of the excitation flux through the rotor R will oscillate as the rotor rotates, but on an average it will be oriented in the same direction with respect to the stator. The number of revolutions N of the rotor relative to the flux pattern is consequently equal to the speed n of the rotor.

Figures 3A, 3B, 3C, 3D:
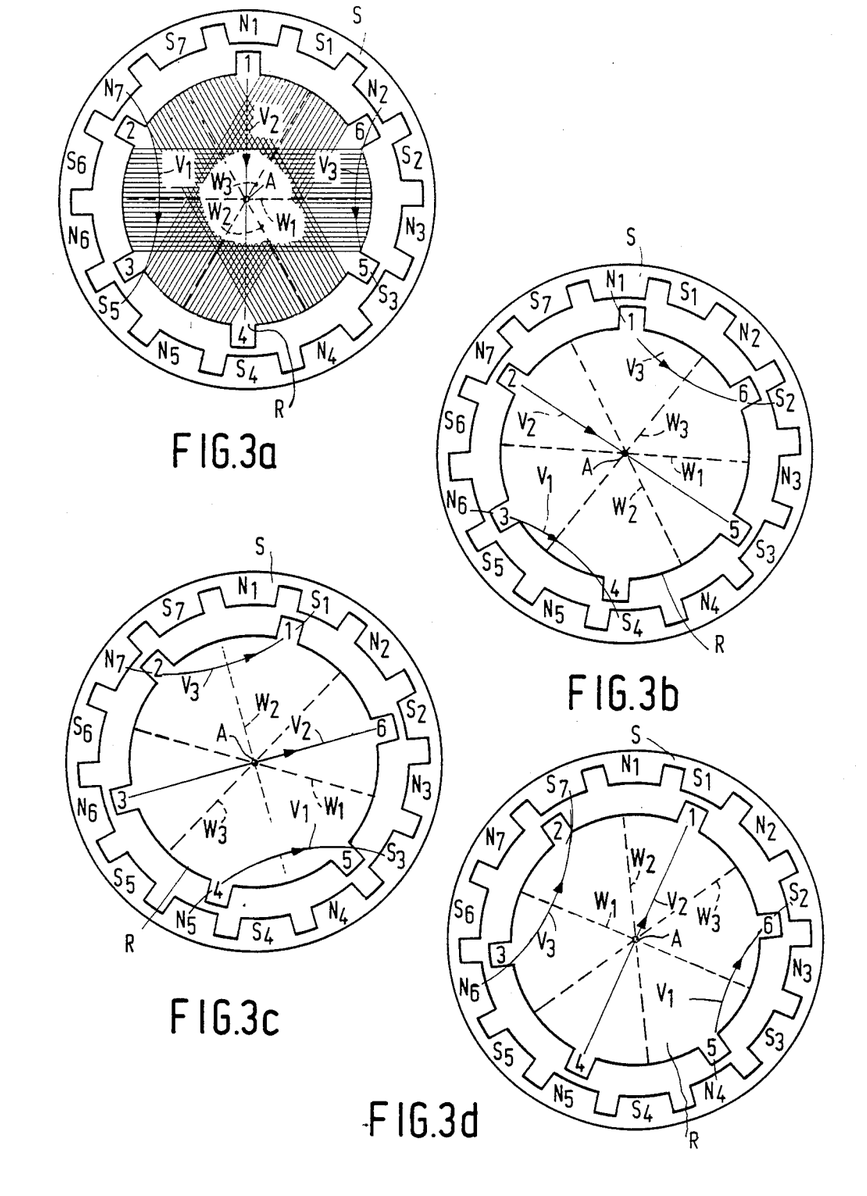
FIGS. 3a–d are diagrammatic views of an electrical machine in accordance with the invention, comprising six rotor teeth and active coils.

In the motor shown in FIG. 3a the rotor tooth 1 is situated underneath the north pole N1. The flux pattern of the excitation flux through the rotor V1, V2 and V3 is then oriented from the top to the bottom. As is apparent from FIGS. 3a–3d, the direction of the flux pattern V1, V2, V3 linking with the schematically shown active coil W1 changes 180° relative to the active coil W1 when the rotor tooth 1 moves from the north pole N1 to the south pole S1. When the rotor has rotated 360° clockwise the flux pattern V1, V2, V3 which links with the active coil W1 has rotated 14 times through 180°. The revolution number N of the rotor relative to the flux pattern of the excitation flux through the rotor is N=7n.

In general, it is possible to demonstrate that N=(t+a)n, when the number of rotor teeth is t and the number of stator teeth is equal to 2(t+a), if the excitation flux is generated by separate means such as coils or permanent magnets, or that it is equal to t+a when the active coils themselves generate the excitation flux. In the first case a is then an integer which differs from zero and −t/2 and in the second case it is a non-zero integer. Therefore, this embodiment complies with the equation $$E = 2(t+a)n\phi w. \tag{5}$$

Consequently, the rotational emf generated in the embodiment shown in FIGS. 3a–d has increased by a factor of 7 in comparison with the conventional dc commutator motor. This factor is referred to hereinafter as k.

Now it will be ascertained how much the magnitude of the factor k=N/n=t+a influences the magnitude of the rotor resistance R. The required number of rotor turns w follows from (5)

$$w = E/(2kn\phi) \tag{6}$$

The specific resistance of copper is $r_o$. The average length of a turn is s. The copper cross-section of the winding wire is $a'$. If all the turns of the rotor were connected in series the resistance would be $$R_{tot} = r_o s w / a' \tag{7}$$

However, the rotor turns are connected in parallel in two branches. The resistance of each branch is $R_{tot}/2$ and the equivalent resistance of the two parallel branches is $R_{tot}/4$. From this and from (7) the rotor resistance can be derived:

$$R = r_o s w / (4a'). \tag{8}$$

The cross-sectional area of all the grooves together is A. Each turn is situated in two grooves. The copper factor of the turns in the grooves is c. This means that $$2wa' = cA. \tag{9}$$

Elimination of $a'$ in (8) and (9) yields $$R = r_o s w^2 / (2cA). \tag{10}$$

Inserting w from (6) in (10) yields:

$$R = r_o E^2 / (8ck^2 \phi^2 A n^2) \tag{11}$$

The area enclosed by a turn is designated Ac B is the average induction of the excitation flux within a turn. $\phi = BA$ also substantially equal for each turn. It follows from the foregoing that $$\phi = BAc \tag{12}$$

Inserting (12) in (11) yields $$R = (\tfrac{1}{8})(1/k^2)(r_o/(cB^2))(s/(AAc^2))(E^2/n^2) \tag{13}$$

The rotor resistance R comprises 5 factors. The first factor is a constant number $\tfrac{1}{8}$. The second factor contains k, the square of which is contained in the denominator. The third factor is technology-dependent:

ro is the specific resistance of copper
   c is the copper factor
   B is the average magnetic induction of the stator field within a turn.

The fourth factor defines the dimensions of the motor.

The smaller the motor, the smaller the average winding length s.

The smaller the motor, the smaller the cross-sectional area of the grooves A.

The smaller the motor the smaller the coil cross-section.

The fifth factor relates to the specifications.

E is the rotational emf which is slightly lower than the supply voltage U.

n is the operating speed.

When the known dc commutator motor with a permanent magnetic stator described and shown herein is converted into a motor in accordance with the invention, the rotor is hardly modified. For a motor comprising five rotor teeth, k=6 and consequently R becomes 36 times as small. The rotor resistance dictates the motor efficiency, the torque-speed curve and the copper losses in the windings. The current, and hence the power of the motor, can be increased by a factor of 36 while maintaining the efficiency and the steepness of the speed-torque curve. The factor k and hence the gain in power can be increased even further by increasing the number of rotor teeth. When the dimensions and speed remain the same, the machine in accordance with the invention consequently delivers a higher power. The inventive principle may also be utilized to obtain the same power at a lower speed or the same power at the same speed but with a motor of smaller dimensions. Moreover, these possibilities may be combined.

Figure 4:
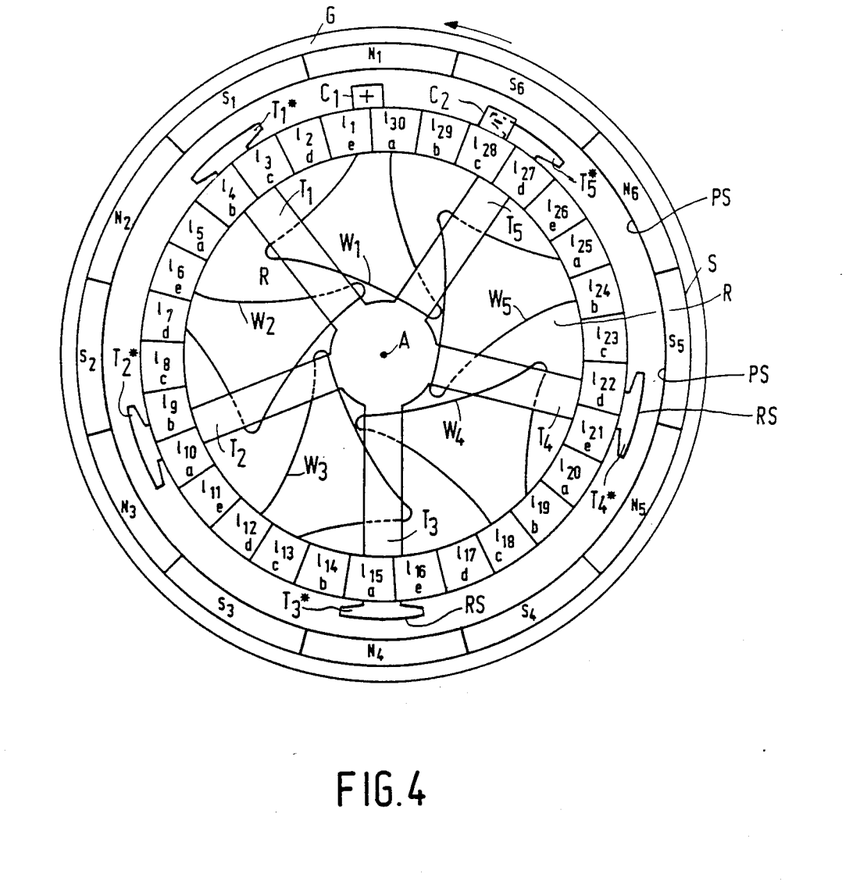
FIG. 4 is a diagrammatic view of an electrical machine in accordance with the invention comprising five rotor teeth.

FIG. 4 shows a dc commutator motor in accordance with the invention comprising a permanent magnetic stator S, a rotor R having 5 rotor teeth T1 to T5 with rotor poles T1* to T5*, and a soft steel magnetic return ring G. There are 6 permanent magnetic stator poles N1 to N6 and 6 permanent magnetic south poles S1 to S6. The number of rotor teeth t of the rotor R is therefore equal to 5 and the number of stator poles $2(t+a)$ is equal to 12, because a is equal to 1. The stator poles each comprise a pole face PS and the rotor poles each comprise a pole face RS which, viewed in the circumferential direction of the rotor, has a smaller dimension than a pole face PS. There are $t(t+a)=30$ commutator segments, numbered L1 to L30. There is a "+" brush C1 underneath the center of the north pole N1 and a "−" brush C2 underneath the center of the south pole S6. A maximum number of 6 "+" brushes is allowed, provided that they are situated underneath a north pole and, similarly, a maximum number of 6 "−" brushes is allowed, provided that they are situated underneath a south pole. Of the five schematically shown coils W1 to W5, the coil W1 surrounds the teeth $T5^x$ and $T1^x$, W2 surrounds the teeth $T1^x$ and $T2^x$, W3 surrounds the teeth $T2^x$ and $T3^x$, W4 surrounds the teeth $T3^x$ and $T4^x$, and TW5 surrounds the teeth $T4^x$ and $T5^x$. In the position shown the active coil W1 on the rotor links the maximum flux, which traverses the coil from the inside towards the outside. At this instant commutation must be effected. The "+" brush C1 underneath the pole N1 then short-circuits the segments L1 and L30. This means that the active coil W1 must be connected to the segments L1 and L30. T1* is now situated underneath S1 and T5* is underneath S6. When the rotor has rotated 60° counterclockwise about the axis A, W1 again links the maximum flux, which is directed from the inside towards the outside. T1* is then situated underneath S2, and T5* is underneath S1. Now again commutation must be effected underneath the "+" brush. The segments L25 and L26 are then situated underneath the "+" brush. Therefore, segment L1 must be interconnected to segment L26, and segment L30 is connected to segment L25. In this way it follows that the following groups of segments must be interconnected.

L1, L6, L11, L16, L21 and L26. These are indicated by e.

L2, L7, L12, L17, L22 and L27. These are indicated by d.

L3, L8, L13, L18, L23 and L28. These are indicated by c.

L4, L9, L14, L19, L24 and L29. These are indicated by b.

L5, L10, L15, L20, L25 and L30. These are indicated by a. Commutation may also be effected electronically.

The coil terminals are then connected to an electronic circuit.

In general, a dc commutator motor in accordance with the invention has the following properties. The laminated rotor core has a shape resembling that of the known commutator motor. It is circularly cylindrical with circumferential grooves filled with windings. The number of grooves and the number of rotor teeth is t. The rotor may be wound in the same way as in the known two pole commutator motor. A circularly cylindrical stator having $2(t+a)$ teeth around the rotor is arranged. Preferably, a is 1, because this yields a maximal effect. The number of coil terminations (common terminals of interconnected active coils) is also equal to t. The number of commutator segments is $t(t+a)$. When a is equal to 1 the first termination, marked 1, is connected to the segments $1, t+1, 2t+1$ etc. to $t^2+1$ inclusive. The second termination, marked 2, is connected to the segments $2, t+2, 2t+2$ etc. to $t^2+2$ inclusive. The last termination, marked t, is secured to the segments $t, t+t, 2t+t$ etc. to $t^2+t$ inclusive.

Figure 5:
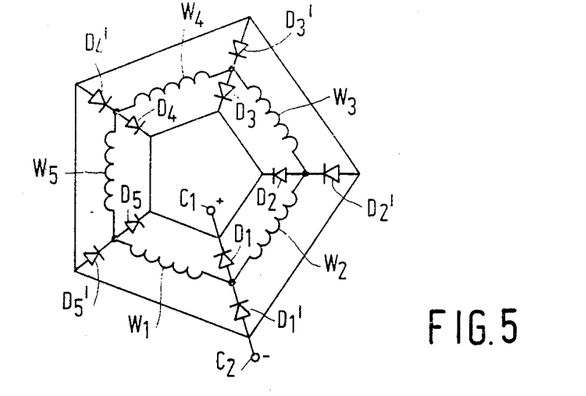
FIG. 5 is the electrical diagram of the rotor of the machine of FIG. 4, operated as a generator.

FIG. 5 shows the diagram for commutation by means of diodes for a dc commutator generator in accordance with the invention, comprising a permanent magnetic stator. The rotor has 5 coils W1-W5. Ten diodes D1-D5 and D1'-D5' are needed. The output voltage on terminals C1 and C2 is a substantially constant direct voltage.

AC Motors

Figure 6:
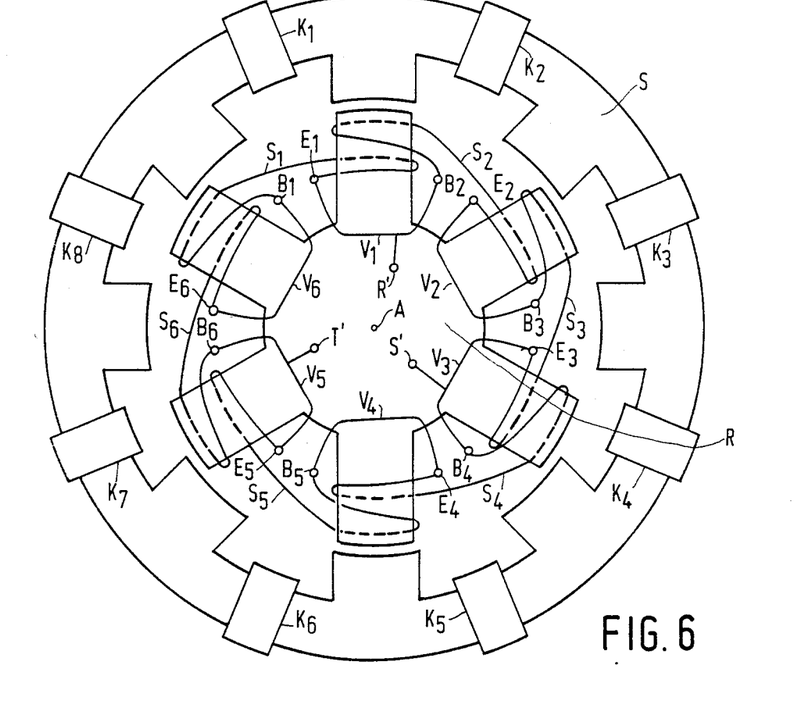
FIG. 6 is a diagrammatic view of a three-phase induction motor in accordance with the invention.

FIG. 6 shows a three-phase induction motor in accordance with the invention. In principle, the rotor R is identical to that of a brushless dc commutator motor. Three coil terminations which are spaced equidistantly are connected to the three terminals of the three-phase mains R', S', T'. In principle, the stator S is a circularly cylindrical steel ring which is formed with seven slots on its inner side. In the slots short circuited windings K1-K8 are arranged. In the present case the rotor has 6 teeth (t=6). If a=2, the excitation flux being furnished by the active coils, the stator has 8 teeth (t+a). The rotor has 6 coils S1-S6 having a beginning B1-B6 and an end E1-E6. The end E1-E6 is connected to the beginning B1-B6 of each subsequent coil S1-S6 via a connecting wire V1-V6. The R', S' and T' phases of the three-phase mains are connected to the connecting wires V1, V3 and V5. Around the lamination core a short-circuiting winding K1-K8 is arranged between two outer teeth of the stator. This motor in accordance with the invention enables a lower synchronous speed and hence a lower asynchronous speed to be obtained. If the mains frequency is 50 Hz, the synchronous speed is $50/8=6.25$ revolutions per second in the present case.

Other Variations

Figure 7:
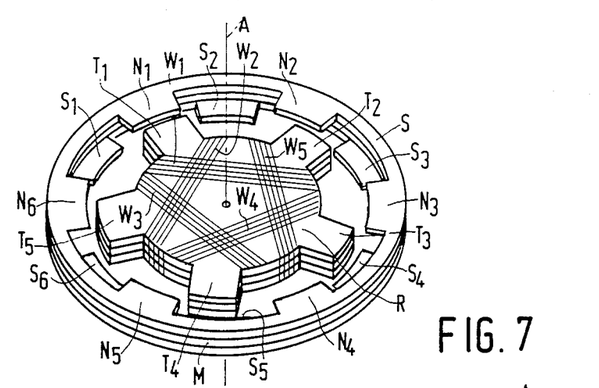
FIG. 7 is a diagrammatic perspective view of an electrical machine in accordance with the invention, employing an annular magnet for generating the excitation flux.

FIG. 7 shows a variant in which an annular magnet M is employed for generating the excitation flux. If constructed as a motor, this machine can be used in two different manners. If the inner part rotates, this part constitutes the rotor. The outer part then forms the stator. Mechanical commutation is possible. In the case of electronic commutation the voltages must be applied to the rotor via slip rings. In the case of the second manner the outer part rotates and constitutes the rotor, the inner part being stationary and constituting the stator. Mechanical commutation is then difficult to realize. In the case of electronic commutation the voltages can be applied directly to the active coils. In either case the machine operates in the same way.

The operation of the machine will be described hereinafter for the situation in which the inner part rotates. The rotor R has five teeth T1-T5. There are also five active coils W1 to W5. Each active coil is wound around two rotor teeth. The annular magnet M supplying the excitation flux is situated in the stator. The annular magnet M is magnetized parallel to the axis A of the motor, the north pole being situated at the upper side and the south pole at the lower side. As a result of this, six north poles N1-N6 are formed in the upper soft magnetic part of the stator S and six south poles S1-S6 are formed in the lower soft magnetic part of the stator. Consequently, the motor has 12 stator teeth. It follows that for this machine the factor $k=t+1$ is equal to 6.

Figure 8:
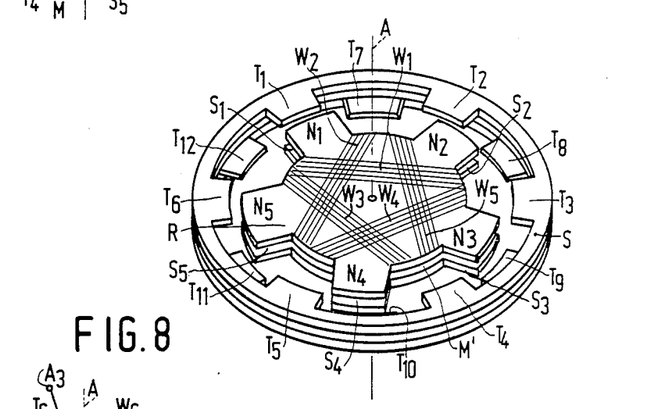
FIG. 8 is a perspective view showing an electrical machine in accordance with the invention, employing an inner disc magnet for generating the excitation flux.

FIG. 8 shows another variant of the machine in accordance with the invention. When constructed as a motor this machine can operate in two different ways with a rotating inner part or a rotating outer part. In either case the operation of the machine is the same. The operation of the machine is now described for the situation in which the inner part rotates. An annular magnet or disc magnet M' in the rotor R provides the excitation flux. This magnet M' is magnetized parallel to the axis A of the motor, the north pole being situated at the upper side and the south pole at the lower side. As a result of this, five north poles N1-N5 are formed in the upper soft magnetic part of the rotor and five south poles S1-S5 are formed in the lower soft-magnetic part of the rotor. Correspondingly numbered north poles and south poles are always superimposed. Active coils W1 to W5 are wound on the rotor R. The stator S is wholly made of a soft magnetic steel and has six stator teeth T1-T6 on its upper side and six stator teeth T7-T12 on its lower side. The stator teeth T7-T12 are offset from the teeth T1-T6 by half a tooth pitch. Each active coil comprises two pole pairs, two north poles at the upper side and two south poles at the lower side. The rotor R is shown in such a position that the active coil W1 links a maximal amount of excitation flux. The excitation flux generated in the magnet M' extends in the upward direction and traverses the active coil W1, the pols N1 and N2, the stator poles T1 and T2, the soft magnetic stator, the stator poles T9, T10 and T11, the rotor poles S3, S4 and S5, the lower soft magnetic part of the rotor, and goes upwards again through the magnet.

If the rotor is now rotated 30° clockwise the rotor poles N1 and N2 are situated across the stator teeth T7 and T8. The excitation flux then passes upwards through the magnet M' in the middle of the rotor, through the rotor poles N3, N4 and N5, the stator teeth T4, T5 and T6, the soft iron stator, the stator teeth T7 and T8, the rotor poles S1 and S2, through the active coil W1, and then up again through the magnet. A 30° rotation of the rotor R causes the direction of the excitation flux through the active coil W1 to change. After a rotation of 60° this means that a full rotation through 360° of the flux is obtained. The factor k is consequently equal to 6. It is alternatively possible to replace the permanent magnet M' by an excitation coil. The magnet is then replaced by an equally thick soft iron disc of slightly smaller diameter. In the space which is now available an excitation coil W is wound around the soft-magnetic disc.

Figure 9:
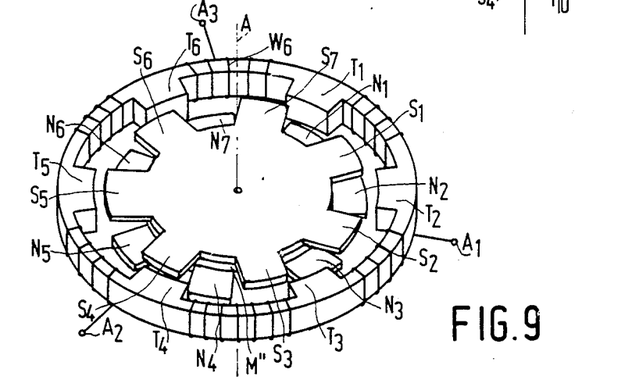
FIG. 9 is a perspective view of a machine in accordance with the invention, comprising an annular winding and permanent-magnetic excitation.

FIG. 9 shows a machine having toroidal-type windings W1 to W6 and permanent magnet excitation by means of a magnet M'' situated in the inner machine part and axially magnetized. On one side of the magnet M'' a toothed soft magnetic part is mounted, so that seven south poles S1-S7 are formed at this side. At the other side of the permanent magnet M'' a similar soft magnetic part is arranged, so that seven north poles N1-N7 are formed at the side. The two soft-magnetic parts are offset from one another by half a tooth pitch. The outer machine part has teeth T1-T7 with interposed slots in which the active coils W1-W6 are arranged. The coils W1-W6 are arranged in series and are wound around the outer machine part in the same direction (sense). Three taps A1, A2 and A3 are provided, between each of which two coils are arranged. The active outer machine part has 6 poles. The other machine part has 14 poles $(a=1)$, namely $2x(t+a)$. The taps A1, A2 and A3 may be connected to electronic switches or, in the case of a synchronous three-phase machine, to the phases of the three-phase mains.

The machine in accordance with the invention may also be constructed as a d.c. series motor or generator. The construction may be as described with reference to FIG. 4, but the permanent magnets are then replaced by steel pole pieces around which coils are arranged. The coils carry the same current as applied to the motor. The machine in accordance with the invention may also be constructed as a three-phase synchronous motor. In principle, the construction is the same as described with reference to FIG. 4. Regularly spaced along the circumference three coil terminations are connected to the three terminals of the three-phase mains. Since the motor it is a synchronous motor is not self-starting but it operates as a synchronous motor, once it has been brought to the synchronous speed.

Alternatively, the machine in accordance with the invention may be constructed as a reluctance motor. The motor then corresponds to the three-phase induction motor described above. However, the short-circuited turns in the stator are omitted. When the coils are connected to the three-phase mains a synchronous motor is obtained having the same speed as the synchronous speed of the three-phase synchronous motor.

Figure 10:
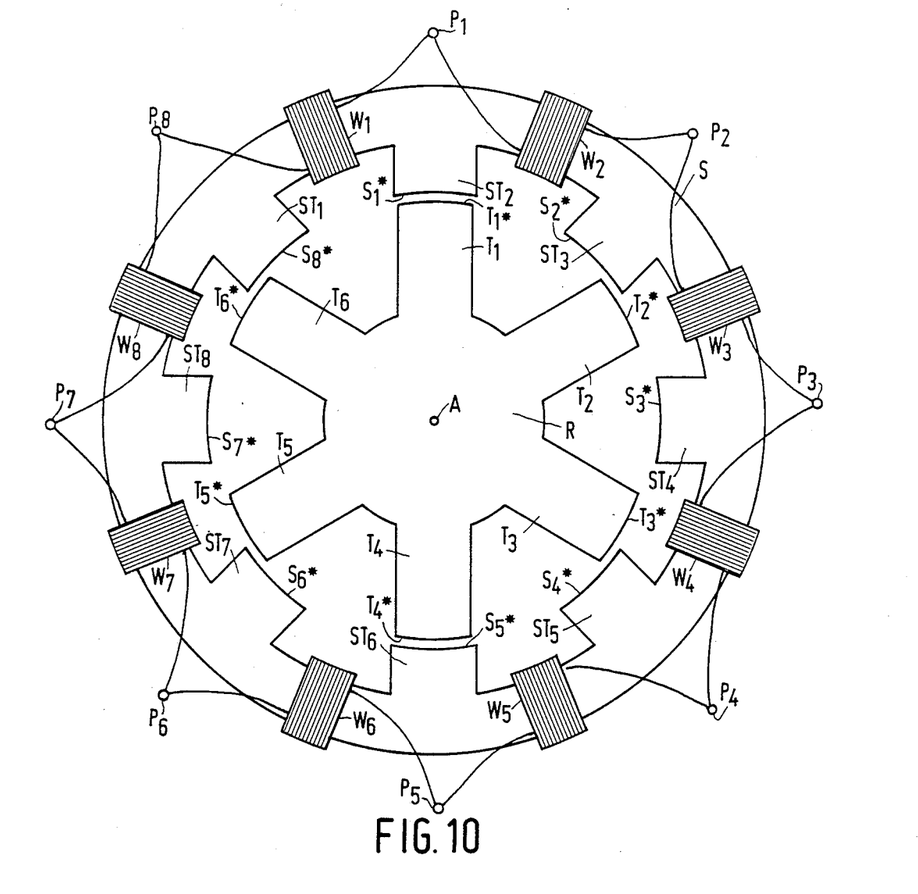
FIG. 10 is a diagrammatic perspective view showing a further electrical machine in accordance with the invention.
Figure 11:
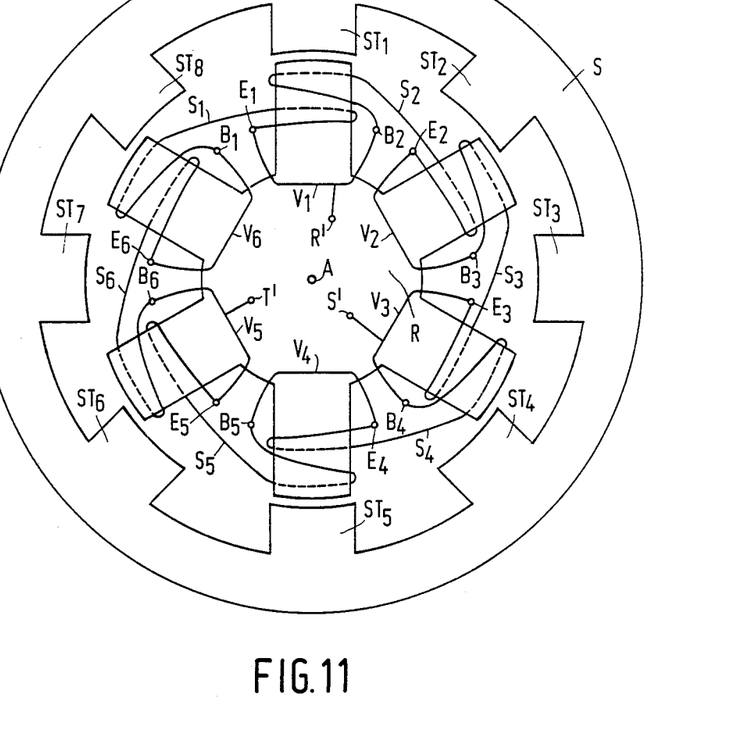
FIG. 11 is a diagrammatic view of yet another electrical machine in accordance with the invention.

Examples of reluctance motors in accordance with the invention are shown in FIGS. 10 and 11. The reluctance motor shown in FIG. 10 has a stator and a rotor R, both made of a soft magnetic material. The stator S has eight stator teeth ST1 to ST8 and eight active coils W1 to W8 constructed as annular windings, the stator teeth and the active coils alternating with one another viewed in the circumferential direction of the stator. The stator teeth ST1 to ST8 constitute stator poles with pole faces S1* to S8*. The rotor R which is rotatable about an axis A has six rotor teeth T1 to T6 with pole faces T1* to T6* which are equidistantly spaced along the rotor circumference, and the pole faces T1* to T6* have a width in the circumferential direction of the rotor which is smaller than the corresponding width of the pole faces S1* to S8*. The action coils W1 are connected to the terminals P1 to P8 of an electronic commutator.

The reluctance motor shown in FIG. 11 has a rotor R which is, in principle, identical to that of a brushless dc commutation motor. Three coil terminations which are equidistantly spaced can be connected to three terminals of a three-phase mains. In principle, the stator S comprises a circularly cylindrical ring of a soft magnetic material provided with eight teeth ST1 to ST8 on its inner side. The rotor has six teeth and six active coils S1 to S6 which are arranged around the teeth and which have a beginning B1-B6 and an end E1-E6. The end E1–E6 is connected to the beginning B1–B6 of each following coil S1 to S6 via a connecting wire V1–V6. The terminals R*, S* and T* are connected to the connecting wires V1, V3 and V5 and can be connected to the phases of a three-phase mains. The stator S has eight stator teeth ST1 to ST8.

Both in the motor of FIG. 10 and in the motor of FIG. 11 the excitation flux is generated by the active coils during operation. In the positions in which they link a maximal portion of the excitation flux, the active coils indeed link the maximal portion of the flux except for stray losses. In both motors the number of poles of the machine part which does not comprise the active coils is equal to t+a, where a=−2 for the motor of FIG. 10 and a=2 for the motor of FIG. 11.

I claim:

1. An electromagnetic machine comprising a rotor and a stator as machine parts, means for generating an excitation flux, and active coils carried on a first of said machine parts, in operation each of said active coils periodically linking at least a portion of the excitation flux and having a rotational emf generated in the respective coil, said rotor comprising a plurality of spaced rotor poles and being rotatable about a rotor axis defining an axial direction, and said stator comprising a plurality of spaced stator poles, and each said active coil being a cylindrical winding wound about a winding axis at least substantially diametrically arranged with respect to said rotor axis, characterized in that the pole faces of at least some of the stator poles have angular dimensions in the direction of relative rotation different from the angular dimensions of at least some of the rotor poles in the direction of relative rotation, in a relative position in which a respective active coil links a maximal portion of the excitation flux, such respective active coil links the entire excitation flux except for stray components thereof, and during operation, as a result of relative rotation of the rotor with respect to the stator, the flux pattern of the portion of the excitation flux linking with the active coils rotates with respect to the first machine part at an angular velocity different from the relative angular velocity between the two machine parts.

2. A machine as claimed in claim 1, wherein said means for generating an excitation flux is separate from said active coils, and the first machine part has t respective poles, t being an integer greater than 3, characterized in that the other machine part has 2(t+a) respective poles, wherein a≠0, and a≠−t/2, and as a result of rotation during operation the flux pattern of the portion of the excitation flux linking the active coils rotates with an angular velocity differing from the angular velocity of the first machine part by an amount having an absolute value greater than the absolute value of the angular velocity between the rotor and the stator.

3. A machine as claimed in claim 2, comprising an outer ring having a magnet magnetized in the axial direction and two soft magnetic rings disposed axially to opposite sides of said magnet, each of the soft magnetic rings having inwardly directed teeth serving as poles, teeth of one of said soft magnetic rings being offset from teeth of the other by half the tooth pitch, and an inner body formed as a cylindrical disc of a soft magnetic material having outwardly directed teeth.

4. A machine as claimed in claim 2, comprising an inner magnet magnetized in the axial direction and two soft magnetic discs disposed axially to opposite sides of said magnet, each of the soft magnetic discs having outwardly directed teeth serving as poles, and an outer annular body of a soft magnetic material having inwardly directed teeth at axially spaced sides, teeth at one of said sides being offset from teeth at the other by half the tooth pitch.

5. A machine as claimed in claim 1, wherein said means for generating an excitation flux comprises said active coils, and the first machine part has t respective poles, t being an integer greater than 3, characterized in that the other machine part has (t+a) respective poles, wherein a≠0, and a≠−t/2, and as a result of rotation during operation the flux pattern of the portion of the excitation flux linking the active coils rotates with an angular velocity differing from the angular velocity of the first machine part by an amount having an absolute value greater than the absolute value of the angular velocity between the rotor and the stator.

6. An electromagnetic machine comprising a rotor and a stator as machine parts, means for generating an excitation flux, and active coils carried on a first of said machine parts, in operation each of said active coils periodically linking at least a portion of the excitation flux and having a rotational emf generated in the respective coil, said rotor comprising a plurality of spaced rotor poles and being rotatable about an axis defining an axial direction, and said stator comprising a plurality of spaced stator poles, and each said active coil being a toroidal-type winding, characterized in that the pole faces of at least some of the stator poles have angular dimensions in the direction of relative rotation different from the angular dimensions of at least some of the rotor poles in the direction of relative rotation, in a relative position in which a respective active coil links a maximal portion of the excitation flux, such respective active coil links substantially half the excitation flux except for stray components thereof, and during operation, as a result of relative rotation of the rotor with respect to the stator, the flux pattern of the portion of the excitation flux linking with the active coils rotates with respect to the first machine part at an angular velocity different from the relative angular velocity between the two machine parts.

7. A machine as claimed in claim 6, wherein said means for generating an excitation flux is separate from said active coils, and the first machine part has t respective poles, t being an integer greater than 3, characterized in that the other machine part has 2(t+a) respective poles, wherein a≠0, and $a \neq -t/2$, and as a result of rotation during operation the flux pattern of the portion of the excitation flux linking the active coils rotates with an angular velocity differing from the angular velocity of the first machine part by an amount having an absolute value greater than the absolute value of the angular velocity between the rotor and the stator.

8. A machine as claimed in claim 7, comprising an inner magnet magnetized in the axial direction and two soft magnetic discs disposed axially to opposite sides of said magnet, each of the soft magnetic discs having outwardly directed teeth serving as poles, and an outer annular body of a soft magnetic material having inwardly directed teeth at axially spaced sides, teeth at one of said sides being offset from teeth at the other by half the tooth pitch, each of said active coils being arranged around said outer member.

9. A machine as claimed in claim 6, wherein said means for generating an excitation flux comprises said active coils, and the first machine part has t respective poles, t being an integer greater than 3, characterized in that the other machine part has (t+a) respective poles, wherein $a \neq 0$, and $a \neq -t/2$, and as a result of rotation during operation the flux pattern of the portion of the excitation flux linking the active coils rotates with an angular velocity differing from the angular velocity of the first machine part by an amount having an absolute value greater than the absolute value of the angular velocity between the rotor and the stator.

* * * * *